March 17, 1959 B. G. GUERRERO 2,878,324

TELEPHONE BRACKET ELEMENTS

Filed June 17, 1957 2 Sheets-Sheet 1

INVENTOR:
Benjamin G. Guerrero
By Smyth & Roston
Attorneys

INVENTOR
Benjamin G. Guerrero

By Smyth & Roston
Attorneys

United States Patent Office 2,878,324

Patented Mar. 17, 1959

2,878,324

TELEPHONE BRACKET ELEMENTS

Benjamin G. Guerrero, Los Angeles, Calif.

Application June 17, 1957, Serial No. 666,055

10 Claims. (Cl. 179—146)

The present invention is concerned generally with supporting brackets, and it is more specifically concerned with an improved bracket structure which is particularly adapted to support a telephone rigidly and securely on an upright supporting surface, such as a wall, and yet to permit the telephone to be removed from the wall at will.

Most present day telephone instruments are designed to be supported on a desk, table or other horizontal supporting surface. However, it is often desirable to mount the instrument either permanently or temporarily on a wall or other vertical supporting surface.

The present trend is to avoid desk top clutter, and this trend encourages the support of telephone sets on adjacent walls, or on the sides of the desk, whenever such is practical. In addition it is not always convenient in the home to have a telephone occupy a table or a counter that could otherwise be put to other uses. For this reason, and others, it is also often convenient in the home to have the telephone instrument mounted on a wall or other available vertical surface. Moreover, when the telephone is removably mounted on the vertical surface, such mounting permits the instrument to be removed and carried from place to place as is often desirable.

A general conversion from desk-type telephones to wall-type not only involves the requirement for new instruments and installation charges, but it also creates problems of a surplusage of desk-type instruments. Also, as noted above, it is desirable in many cases that the conversion from the desk-type of telephone to the wall-type be only temporary. In fact, the situation frequently occurs where it is desired that the instrument be supported on the wall and yet be able to be carried from room to room to be plugged into receptacles in the different rooms.

The present invention fully and completely answers the need outlined in the previous paragraphs. This is realized by the provision of a bracket element that may be quickly and easily fastened to the wall or other vertical supporting surface.

The use of the improved bracket element of the present invention enables a desk-type telephone to be quickly and easily snapped into position on a vertical wall, and this is achieved without altering or modifying in any manner the instrument itself.

In brief, therefore, a principal object of the present invention is to provide a simple bracket element that may be fixed to a wall or other upright supporting surface, and which bracket is capable of removably supporting a telephone base in a rigid and secure manner and without the need to modify the telephone in any way.

The bracket element of the invention has, in one embodiment, a reversely-bent resilient or flexible end portion which conforms to the contours of the base of the telephone to be supported. This resilient portion of the bracket embraces a portion of the base of the telephone, and the extremity of the resilient portion serves as a bracket to hold the hand set portion of the telephone in the cradle of the base when the telephone is supported by the bracket.

In one embodiment of the invention, the extremity of the flexible end portion is itself bent over to form a horizontal trough-like structure. This trough-like structure holds the hand piece of the instrument in the cradle of the telephone base and in contact with the usual spring biased switch actuators of the instrument.

In another embodiment of the invention, a cradle-like structure is pivoted to the extremity of the flexible end portion of the bracket. This cradle-like structure serves to support the hand set of the telephone, and when the hand set is so supported, the cradle-like structure pivots down on the switch actuator of the telephone.

In other embodiments of the invention, the bracket is made into a two-piece element, with one portion slidably engaging the other. This permits the bracket to be adjusted when it is mounted on the supporting surface so as to enable different sizes of telephones to be supported by it.

The bracket may be conveniently formed to include a support at one of its ends or the other for a pencil and writing tablet. This support may be integrally formed with the bracket and shaped so that a usual writing tablet may be inserted or withdrawn from it.

In the drawings:

Figure 1 is a perspective view of a bracket constructed in accordance with one embodiment of the invention and which is intended to removably support a telephone on a vertical supporting surface, such as a wall;

Figure 2 is a side elevational view of the bracket of Figure 1, and this view illustrates the bracket mounted on a vertical supporting surface and shows the bracket as including a reversely-bent resilient end portion which is shaped to conform with the contour of the telephone to be supported, the end portion having a bent-over extremity which forms a horizontal trough for supporting the hand set of the telephone when the telephone base is held by the bracket;

Figures 5, 6, 7, 8, 9:
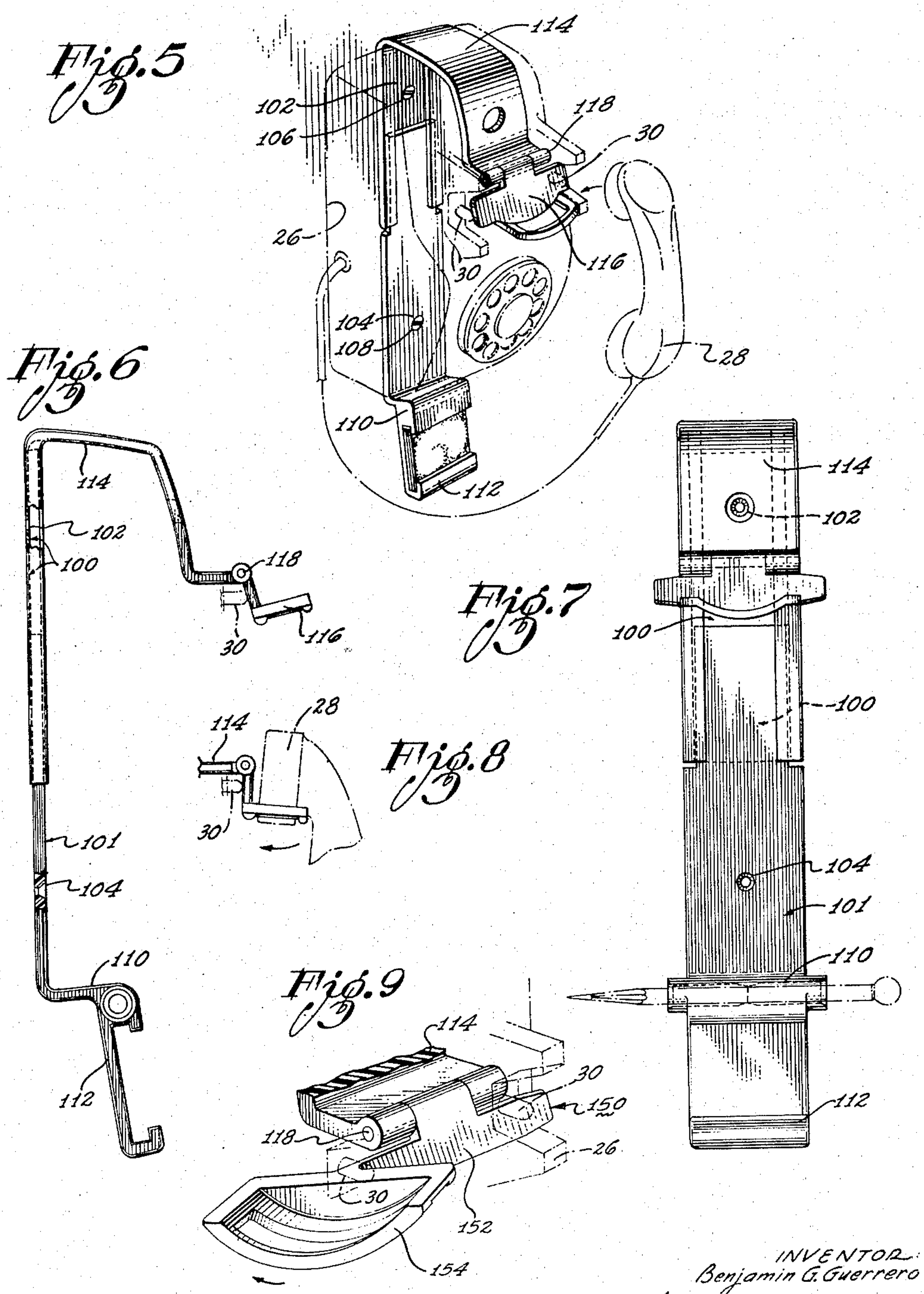
Figure 5 shows a second embodiment of the invention which includes a cradle-like structure for supporting the hand set of the telephone to be supported, this cradle-like structure being pivoted to the end of the resilient portion of the bracket in a position to engage the spring biased push-button switch actuators of the telephone when the hand set is in place.
Figure 6 is a side elevational view of the embodiment shown in Figure 5, and particularly showing a construction for the unit whereby the bracket is in two slidably engaged pieces, this construction enabling the bracket to be used with different sizes of telephone instruments.
Figure 7 is a front elevational view of the bracket of Figure 5.

Figure 8 is a fragmentary view of the cradle-like structure of the second embodiment of the invention showing the engagement of this structure with one of the push-button actuators when the hand set is in place; and Figure 9 is a fragmentary view of a bracket assembly similar to that shown in Figure 5 but in which the cradle-like structure for the hand piece of the telephone is shaped in a manner so that the hand piece may conveniently be held to one side of the instrument being supported by the bracket.

The bracket illustrated in Figures 1–4 includes a strap 10 which is formed of a suitable metal or plastic. The strap 10 includes a central portion 12 which has a pair of spaced apertures 14 and 16 extending through it. These apertures permit the strap 10 to be secured to a wall or other vertical surface 18 by means, for example, of a pair of screws 20.

The strap 10 has a relatively rigid lower end portion 22 which extends outwardly and which is adapted to form a shelf which engages one end of the telephone to be supported. The strap 10 also has an upper relatively flexible or resilient portion 24. The portion 24 has a reversely-bent configuration, and it is shaped to conform essentially to the contours of the base of the telephone to be supported.

Figures 1, 2, 3, 4:
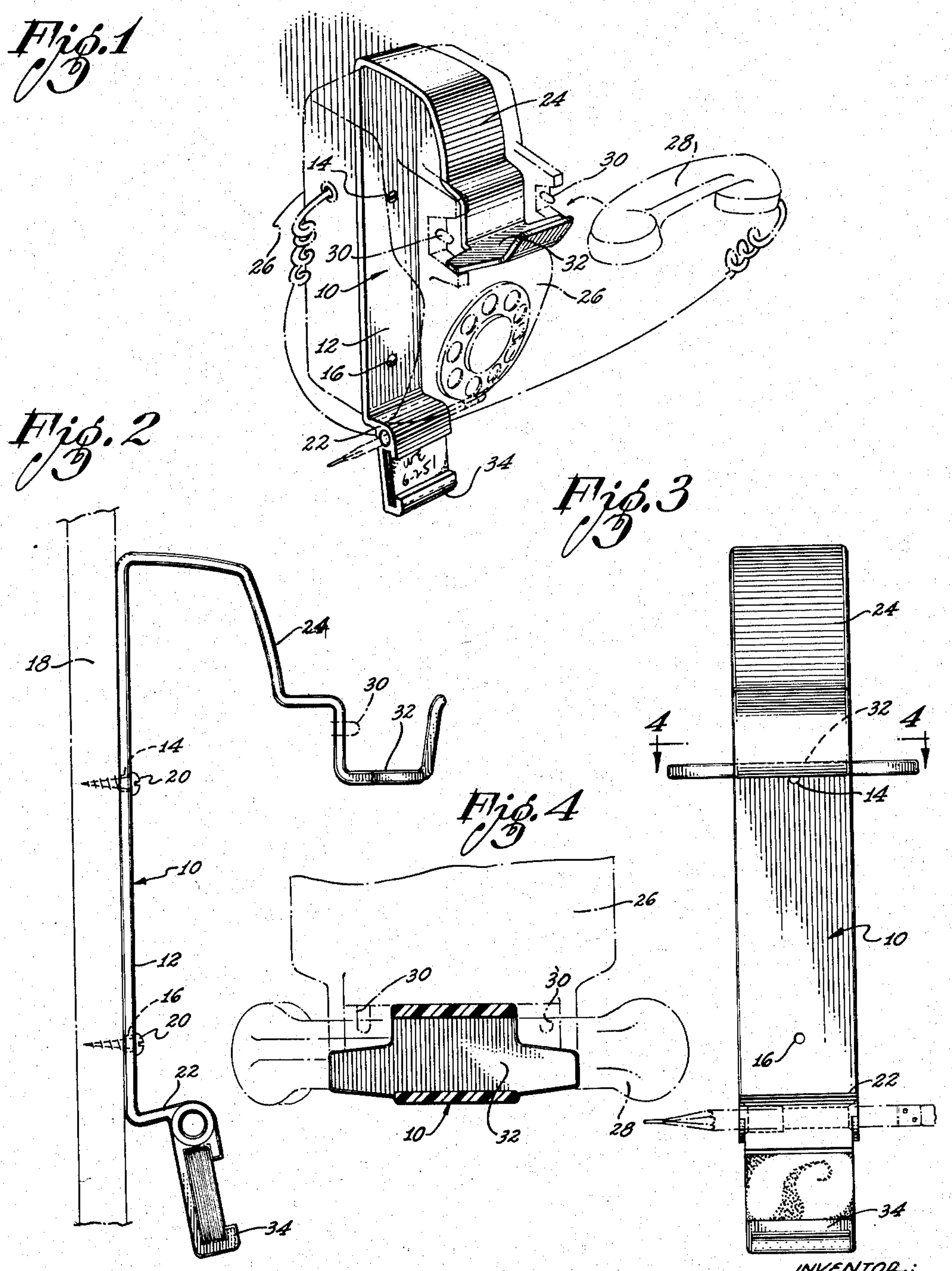
Figure 3 is a front elevational view of the bracket of Figure 1.
Figure 4 is a cross-sectional view of the bracket taken along the line 4—4 of Figure 3.

As shown in Figure 1, the bracket of the invention is adapted, for example, to support the base of a telephone indicated by the shadow outline 26. One end of the telephone rests on the outwardly extending relatively rigid end portion 22 of the strap 10, and the flexible end portion 24 of the strap embraces a portion of the base of the telephone. The telephone includes a usual cradle for the hand set 28 associated with it, and it also includes a usual pair of spring biased push-button switch actuators 30. The switch actuators extend through the base 26 in known manner in the vicinity of the cradle portion of the base.

The extremity of the end portion 24 has a bent-over configuration which forms a substantially horizontal trough-like supporting structure 32 for the hand set 28. This trough-like structure is adapted to be in essentially a horizontal plane when the bracket is supported on a vertical supporting surface. It is apparent, that the hand set 28 can be placed and supported on the trough-like structure 32 in the vicinity of the cradle associated with the base of the telephone. When the hand set is so inserted, it operates the switch actuators 30 to disconnect the telephone circuit when the receiver or hand set is replaced on the bracket.

The relatively rigid end portion 22 may conveniently have a bracket 34 formed integrally with it. This bracket is shaped to removably hold a memo pad and also a pencil in the illustrated positions.

The bracket shown in Figures 5–8 includes a pair of straps 100 and 101 which are adapted slidably to engage one another. The section 100 has an aperture 102, and the section 101 has an aperture 104. These apertures receive the mounting screws 106 and 108 which affix the bracket to the vertical supporting surface. The sections 100 and 101 may be slidably adjusted with respect to one another to define a length corresponding to the size of the telephone instrument to be supported. Then, when the screws 106 and 108 are inserted, the bracket is firmly held on the supporting surface at the desired length.

The end of the strap section 101 has a relatively rigid outwardly extending portion 110. This portion, as in the previous embodiment, forms a shelf which is adapted to engage one end of the telephone base 26 when the telephone base is inserted in the bracket.

A bracket structure 112 may, as in the previous embodiment, be formed integral with the end portion 110, and this structure may serve to removably support a memo pad and pencil. The structure 112, like the structure 34, of course is not essential in the practicing of the invention. Moreover, either of these structures 112 or 34 may be supported at the top of the bracket 10 at the junction of the strap 12 and its flexible end portion in the previous embodiment, or at the junction of the section 100 and its end portion 114 in the embodiment presently being described.

The end portion 114, like the end portion 24, is relatively flexible and is shaped with a reversely-bent configuration to follow the contour of the base of the telephone to be supported, and to embrace a portion of that base. In the present embodiment, a cradle-like bracket 116 is pivoted to the end of the portion 114, the portion 114 and the bracket 116 each having rolled-over or barrel portions for receiving a pivot pin 118. The cradle-like bracket 116 extends into the cradle of the supported telephone base 26, and it has a pair of ears which extend over the push-button switch actuators 30.

The hand set 28 is adapted to be hung by its earpiece in the bracket 116 (as shown in Figure 8), the bracket being suitably apertured to receive the rim of the earpiece. As also shown in Figure 8, the weight of the hand set when it is placed in the bracket 116 causes the bracket to pivot in a clockwise direction against the switch actuators 30. This enables the switch actuators to break the telephone circuit when the hand set is in place, as is desired.

The embodiment shown in the fragmentary view of Figure 9 is essentially similar to that discussed above in conjunction with Figures 5–8, and like elements have been designated by the same numbers. In the embodiment of Figure 9, a bracket 150 is pivoted to the extremity of the end portion 114, rather than the bracket 116. The bracket 150 has a strip-like portion 152 which is pivoted to the pivot pin 118 and which extends across the cradle of the supported telephone and across the push-button switch actuators 30 which protrude from the base in the vicinity of that cradle.

The bracket 150 has a cradle-like portion 154 which, like the structure 116 is adapted to engage the rim of the earpiece of the hand set 28. The portion 154 is formed integral with the strip 152 at one end of the strip. The portion 154 may extend at an inclination to the plane of the strip 152, or it may be perpendicular to that plane. The portion 154 supports the hand set of the telephone in a convenient location to one side of the base of the telephone. This, under some circumstances, may provide a more convenient and compact arrangement than the one shown in Figure 5 in which the hand set 28 extends down the face of the base 26 of the telephone.

It will be appreciated that the bracket of the invention supports the telephone instrument without the need to modify the instrument mechanically or electrically in any manner. Moreover, the relatively flexible top portion of the bracket of the invention enables the telephone quickly and conveniently to be snapped in and out of place. When the telephone is in place, it is rigidly and securely held against the vertical surface. Also, the hand set is accommodated in a simple and convenient manner, and it is held against the switch actuators 30 to disconnect the telephone circuit when the hand set is in place.

As noted above, the bracket of the invention can be made from any suitable plastic or metallic substance. The bracket is relatively simple and inexpensive to construct, and the materials used may likewise be inexpensive and easily procurable.

The invention enables a telephone set to be supported on any convenient vertical supporting surface, and it also enables the instrument to be removed at any time when so desired.

Although the now preferred embodiment of the present invention has been shown and described herein, it is to be understood that the invention is not to be limited thereto, for it is susceptible to changes in form and detail within the scope of the appended claims.

I claim:

1. A bracket for supporting a telephone on an upright mounting surface, the telephone including a base and a hand set, said bracket including: strap means adapted to be mounted on the mounting surface and shaped to embrace at least a portion of the base of the telephone to be supported, and a supporting means for the hand set of the telephone to be supported formed on said strap.

2. A bracket for supporting a telephone on an upright mounting surface, the telephone including a base and a hand set, said bracket including: strap means adapted to be mounted on the mounting surface, said strap means having a reversely-bent flexible portion adapted to embrace a portion of the base of the telephone to be supported, and a supporting means for the hand set of the telephone to be supported formed at the extremity of said flexible portion.

3. A bracket for supporting a telephone on a vertical mounting surface, the telephone including a base and a hand set, said bracket including: strap means adapted to be mounted on the mounting surface and shaped to conform essentially to the contours of the base of the telephone to be supported, said strap means having one relatively rigid outwardly extending end portion and having a flexible end portion, said flexible end portion being shaped to extend over and embrace the base of the telephone to be supported and to form a supporting element for the hand set.

4. A bracket for supporting a telephone on an upright mounting surface, the telephone including a base and a hand set, with a cradle for the hand set being formed on the base, said bracket including: strap means adapted to be mounted on the mounting surface, said strap means having one relatively rigid outwardly extending end portion and having a reversely-bent flexible end portion, said flexible end portion being shaped to conform essentially with the contour of the base of the telephone to be supported and being adapted to embrace a portion of such base, and a supporting means for the hand set of the telephone to be supported formed at the extremity of said flexible end portion in the vicinity of the cradle.

5. A bracket for supporting a telephone on an upright mounting surface, the telephone including a base and a hand set, with a cradle for the hand set being formed on the base, said bracket including: strap means adapted to be mounted on the mounting surface and having a relatively rigid outwardly extending end portion and a reversely-bent flexible end portion, said flexible end portion being shaped to conform essentially with the contours of the base of the telephone to be supported and being adapted to embrace a portion of such base, said flexible end portion having a bent-over extremity forming a trough-like supporting means for the hand set of the telephone to be supported to support such hand set in the vicinity of the cradle on the base of the telephone.

6. A bracket for supporting a telephone on an upright mounting surface, the telephone including a base and a hand set, with a cradle for the hand set being formed on the base and with at least one spring biased switch actuator being adjacent the cradle to be actuated by the hand set, said bracket including: strap means adapted to be mounted on the mounting surface, said strap means having one relatively rigid outwardly extending end portion and having a reversely-bent flexible end portion, said flexible end portion being shaped to conform essentially with the contour of the base of the telephone to be supported and being adapted to embrace a portion of such base, and supporting means for the hand set of the telephone to be supported formed at the extremity of said flexible end portion in the vicinity of the cradle, said supporting means supporting the hand set in operating contact with the switch actuator adjacent such cradle.

7. A bracket for supporting a telephone on an upright mounting surface, the telephone including a base and a hand set, with a cradle for the hand set being formed on the base, said bracket including: strap means adapted to be mounted on the mounting surface, said strap means having one relatively rigid outwardly extending end portion and having a reversely-bent flexible end portion, said flexible end portion being shaped to conform essentially with the contour of the base of the telephone to be supported and being adapted to embrace a portion of such base, supporting means for the hand set of the telephone to be supported formed at the extremity of said flexible end portion in the vicinity of the cradle, and bracket means formed integral with said strap for supporting a memo pad.

8. A bracket for supporting a telephone on a vertical surface, which telephone includes a base and a separate hand set, the base including a cradle portion for the hand set and at least one spring biased switch actuator in the vicinity of the cradle portion to be actuated by the hand set, said bracket including: a strap shaped to conform to some extent with the contours of the base of the telephone to be supported, said strap having a central portion to receive the bottom of the base of the telephone, said central portion being adapted to be secured to a vertical supporting surface, said strap further having a relatively rigid lower end portion projecting outwardly from said central portion to engage one end of the base of the telephone, said strap further having a reversely-bent flexible upper end portion to extend around the other end of the base of the telephone and engage the cradle portion thereof, and said upper end portion having a bent-over trough-like extremity shaped to extend in an essentially horizontal plane when said central portion is disposed in a vertical plane, said trough-like extremity serving to support the hand set in the cradle portion of the base of the telephone with the hand set in engagement with the switch actuator.

9. A bracket for supporting a telephone on an upright mounting surface, the telephone including a base and a hand set, with a cradle for the hand set being formed on the base and with at least one spring biased switch actuator being adjacent the cradle to be actuated by the hand set, said bracket including: strap means adapted to be mounted on the mounting surface and having a reversely-bent flexible end portion, said end portion being shaped to conform essentially with the contours of the base of the telephone to be supported and being adapted to embrace a portion of such base and extend to the cradle thereon, and a supporting structure for the hand set pivoted to the extremity of said flexible end portion, said supporting structure having a portion adapted to engage the switch actuator adjacent the cradle of the supported telephone when the hand set of such telephone is supported in the supporting structure.

10. A bracket for supporting a telephone on an upright mounting surface, the telephone including a base and a hand set, said bracket including: strap means adapted to be mounted on the mounting surface and having a first central portion slidably engaging a second central portion, a relatively rigid outwardly extending end portion formed integral with said first central portion of said strap, a reversely-bent flexible end portion formed integral with said second central portion of said strap, said flexible end portion being shaped to conform essentially with the contours of the base of the telephone to be supported and being adapted to embrace a portion of such base, and supporting means for the hand set formed at the extremity of said flexible end portion.

References Cited in the file of this patent

UNITED STATES PATENTS

| | | |
|---|---|---|
| 2,277,280 | Vaughan | Mar. 24, 1942 |
| 2,467,383 | Huff | Apr. 19, 1949 |
| 2,492,375 | Boswau | Dec. 27, 1949 |